United States Patent
Koike et al.

(10) Patent No.: US 8,012,241 B2
(45) Date of Patent: Sep. 6, 2011

(54) METHOD AND APPARATUS FOR CONDENSING OZONE GAS

(75) Inventors: Kunihiko Koike, Moriyama (JP);
Sadaki Nakamura, Moriyama (JP);
Koichi Izumi, Moriyama (JP); Goichi Inoue, Moriyama (JP)

(73) Assignee: Iwatani Corporation, Osaka-shi (JP)

( * ) Notice: Subject to any disclaimer, the term of this patent is extended or adjusted under 35 U.S.C. 154(b) by 298 days.

(21) Appl. No.: 12/444,649

(22) PCT Filed: Nov. 24, 2006

(86) PCT No.: PCT/JP2006/323444
§ 371 (c)(1),
(2), (4) Date: Apr. 7, 2009

(87) PCT Pub. No.: WO2008/062534
PCT Pub. Date: May 29, 2008

(65) Prior Publication Data
US 2010/0005961 A1  Jan. 14, 2010

(51) Int. Cl.
C01B 13/10 (2006.01)
B01D 53/04 (2006.01)
(52) U.S. Cl. .................. 95/95; 95/138; 96/121
(58) Field of Classification Search ............. 95/95, 138, 95/148; 96/108, 121, 130; 422/186.07; 210/760
See application file for complete search history.

(56) References Cited

U.S. PATENT DOCUMENTS

| 4,604,279 | A | * | 8/1986 | Leitzke et al. ............... 423/581 |
| 5,507,957 | A | * | 4/1996 | Garrett et al. ................ 210/760 |
| 5,520,887 | A | | 5/1996 | Shimizu et al. |
| 5,846,298 | A | * | 12/1998 | Weist, Jr. ..................... 95/138 |
| 6,254,763 | B1 | * | 7/2001 | Izumi et al. .................. 205/626 |
| 6,916,359 | B2 | * | 7/2005 | Jain .................................. 95/99 |

FOREIGN PATENT DOCUMENTS

| JP | 55062801 | 5/1980 |
| JP | 61-72602 | 4/1986 |
| JP | 2002-210339 | 7/2002 |
| JP | 3766983 | 2/2006 |

* cited by examiner

*Primary Examiner* — Frank Lawrence, Jr.
(74) *Attorney, Agent, or Firm* — Rankin, Hill & Clark LLP

(57) ABSTRACT

The present invention provides a method and an apparatus for condensing ozone arranged so as to efficiently take out the ozone gas of a predetermined concentration, although its construction is simple. The method for condensing the ozone gas comprises acting ozone-oxygen mixture gas on an adsorbing cylinder which is filled in its interior area with an adsorbent so as to selectively adsorb the ozone gas to an adsorbent and desorbing the selectively adsorbed ozone gas so as to condense and purify the ozone gas. The method further includes acting the ozone-oxygen mixture gas on the adsorbent in non-cooled state to selectively adsorb the ozone gas to the adsorbent and vacuuming the adsorbing cylinder on performing desorption-operation of the ozone gas to desorb the ozone gas from the adsorbent.

3 Claims, 4 Drawing Sheets

| OZONE CONCENTRATION IN RAW-MATERIAL g/m³ (vol%) | ADSORBING FLOW AMOUNT slm | ADSORBING AND DESORBING CYCLE sec | ADSORBING PRESSURE kPa·G | VACUUM DEGREE ON DESORPTION kPa·G | GENERATED OZONE CONCENTRATION g/m³ (vol%) | CONDENSING EFFICIENCY | FLOW AMOUNT ALLOWING CONTINUOUS GENRATION slm | THROWED-IN OZONE AMOUNT g/hr | RECOVERED OZONE AMOUNT g/hr | YIELD |
|---|---|---|---|---|---|---|---|---|---|---|
| 50.0(2.3) | 10 | 20 | 3.4 | -91.4 | 97.2(3.5) | 1.88 | 3.7 | 31.0 | 21.3 | 0.69 |
| | | 30 | | -95.4 | 123.2(5.7) | 2.35 | 2.6 | 31.5 | 18.9 | 0.60 |
| | | 40 | | -96.9 | 141.7(6.6) | 2.74 | 2.2 | 31.1 | 18.3 | 0.59 |
| | | 50 | | -97.5 | 156.2(7.3) | 3.04 | 1.6 | 30.8 | 14.7 | 0.48 |
| | | 60 | | -97.8 | 172.5(8.1) | 3.25 | 1.4 | 31.8 | 14.1 | 0.44 |
| | 15 | 20 | 7.1 | -91.4 | 108.6(5.1) | 2.12 | 3.6 | 46.2 | 23.7 | 0.51 |
| | | 30 | | -95.2 | 133.6(6.2) | 2.66 | 2.7 | 44.9 | 22.0 | 0.49 |
| | | 40 | | -96.7 | 153.8(7.2) | 2.99 | 2.2 | 46.4 | 19.8 | 0.43 |
| | | 50 | | -97.3 | 166.7(7.8) | 3.23 | 1.8 | 46.4 | 17.6 | 0.38 |
| | | 60 | | -97.8 | 179.8(8.4) | 3.54 | 1.5 | 45.7 | 15.8 | 0.34 |
| | 20 | 20 | 12.3 | -91.4 | 113.7(5.3) | 2.30 | 3.9 | 59.3 | 26.8 | 0.45 |
| | | 30 | | -95.0 | 137.6(6.4) | 2.77 | 2.8 | 59.6 | 23.5 | 0.39 |
| | | 40 | | -96.9 | 155.3(7.2) | 3.12 | 2.2 | 59.6 | 20.9 | 0.35 |
| | | 50 | | -97.8 | 170.5(8.0) | 3.47 | 1.9 | 59.0 | 19.0 | 0.32 |
| | | 60 | | -98.2 | 185.3(8.6) | 3.57 | 1.6 | 62.3 | 17.3 | 0.28 |

FIG.2

METHOD AND APPARATUS FOR CONDENSING OZONE GAS

TECHNICAL FIELD

The present invention relates to a method and an apparatus for supplying ozone gas condensed within a predetermined concentration range to an ozone consumption equipment such as a semi-conductor production equipment and the like and more particularly concerns a method and an apparatus for purifying ozone gas generated by an ozone generator (ozonizer) and supplying the purified ozone gas as an ozone gas condensed within the predetermined concentration range.

BACKGROUND ART

Generally, ozone gas is generated by feeding oxygen gas from an oxygen-gas cylinder or separated from the air to an ozone generator. However, even if the ozone gas is generated by using the oxygen gas from the oxygen-gas cylinder, the thus obtained ozone gas exists in the oxygen gas with only a concentration of about 5 vol % to 10 vol %. Further, since the ozone gas is strong in self-decomposability, the ozone gas self-decomposes while it is passing through an ozone-gas supply route. At a stage where it is supplied to an ozone-gas consumption equipment, it has a property that its concentration becomes much lower and besides the supply-concentration is unstable. Recently, in the semi-conductor production field, to make use of the oxidation activity of the ozone is increasing for forming an oxidation film on a substrate or the like. In this case, it is desired to supply ozone gas of a stable middle concentration so as to stably produce an oxidation film of an appropriate thickness within a short period of time.

Then the present Applicant's previous proposal was to condense and purify ozone gas by supplying to an adsorbing cylinder filled with an ozone adsorbent, ozone-oxygen mixture gas from an ozone generator (see Patent Literature 1).

Patent Literature: Patent Application Laid-Open No. 2003-171104

DISCLOSURE OF THE INVENTION

Problem the Invention Attempts to Solve

Conventionally, in the case of condensing ozone by adsorbing it, the adsorbent is cooled to enhance its adsorbing ability and the ozone-oxygen mixture gas is acted on the adsorbent retained in this low-temperature state and the ozone gas is made to have the priority to be absorbed by the adsorbent so as to increase the temperature or control the pressure within an adsorbing cylinder so that the ozone gas is desorbed from the adsorbent. This caused a problem that a cooling and heating cycle is required to condense ozone as well as another pressurizing and pressure-reducing cycle, with the result of necessitating extra energy and enlarging the apparatus. In addition, since the temperature of the adsorbent exerts a large influence on the condensing property, it takes lots of time to cool the temperature of the adsorbent to a predetermined one after the desorption step and complicate its control.

The present invention has been made by focusing on the above points and has an object to provide a method and an apparatus for condensing ozone, enabling ozone-gas of a predetermined concentration to be efficiently taken out, although its construction is simple.

Means for Solving the Problems

In order to accomplish the object, one aspect of the present invention is characterized in that ozone gas is desorbed from an adsorbent by acting ozone-oxygen mixture gas on the adsorbent in non-cooled state so as to selectively adsorb the ozone gas to the adsorbent and vacuuming an adsorbing cylinder by a vacuum pump on performing a desorption-operation of the ozone gas, and that thus desorbed purified ozone gas is fed to a buffer tank arranged on a downstream side of the vacuum pump so as to uniformize a concentration of the purified ozone gas. Another aspect of the invention is characterized in that at least two adsorbing cylinders each of which is filled in its interior area with an adsorbent that selectively adsorbs ozone gas in non-cooled state are arranged in parallel to each other, a gas-introduction valve, a gas lead-through valve and a gas-discharge valve being attached to each of the adsorbing cylinders, a gas-introduction passage with an ozone generator attached thereto being connected to the gas-introduction valve, a purified ozone-gas lead-through passage with a vacuum pump and a buffer tank attached thereto in order from the side of the adsorbing cylinder being connected to the gas lead-through valve, a gas-discharge passage with an ozone decomposer attached thereto being connected to the gas-discharge valve, the gas-introduction valve and the pas-discharge valve attached to each of the adsorbing cylinders being arranged to open and close synchronously, the gas-introduction valve and the gas lead-through valve attached to the same adsorbing cylinder being controlled so as to open alternatively, and each of the valves being switching-over controlled so as to alternatively repeat an adsorbing step of communicating each of the adsorbing cylinders with the gas-introduction passage and a desorption step of communicating each of the adsorbing cylinders with the purified ozone-gas lead-through passage.

Here the adsorbent in non-cooled state means that the adsorbent is in a state not to supply thermal energy from an exterior area so as to enhance the adsorbing ability of the adsorbent. Therefore, slight cooling for preventing the adsorbent from increasing its temperature with the reaction heat produced from a reaction with the ozone falls within a scope of non-cooling state.

Effect of the Invention

The present invention comprises acting ozone-oxygen mixture gas generated by the ozone generator on the adsorbent retained at, so-called, a normal temperature without cooling the adsorbent so as to enhance its adsorbing ability, making the ozone gas have the priority to be adsorbed to the adsorbent and vacuum-desorbing the ozone gas by the function of the vacuum pump attached to the gas lead-through passage on performing the desorption. Therefore, the present invention can maintain a high desorption-speed and stably supply ozone gas condensed so that it has its concentration as much as three to four times that of the supplied ozone gas, in a predetermined flow amount, although the adsorbing amount is smaller when compared with that which cools the adsorbent to adsorb the ozone gas.

BRIEF DESCRIPTION OF THE DRAWINGS

FIG. 2 is a Table showing how much ozone gas is purified;

EXPLANATION OF NUMERAL

1 ... adsorbent, 2 ... adsorbing cylinder, 4 ... gas-introduction passage, 5 ... purified ozone-gas lead-through passage, 6 ... gas-discharge passage, 7 ... gas-introduction valve, 8 ... ozone generator, 10 ... gas lead-through valve, 11 ... vacuum pump, 15 ... gas-discharge valve, 16 ... ozone decomposer

MOST PREFERRED EMBODIMENT OF THE INVENTION

Figure 1:
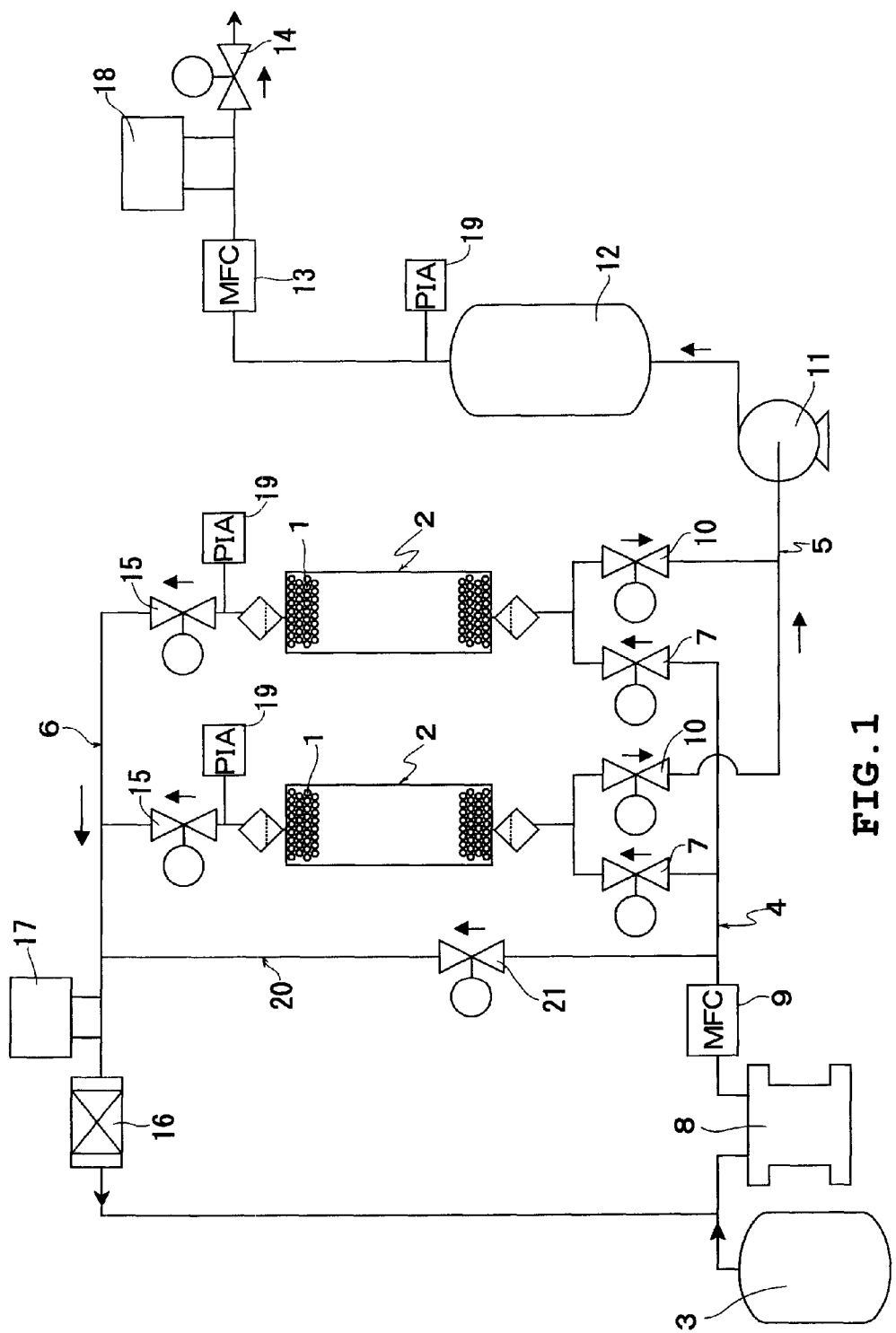
FIG. 1 shows a system flow chart showing an exemplified embodiment of the present invention.

FIG. 1 is a system flow chart showing an exemplified embodiment of the present invention. This ozone-gas condensing apparatus comprises adsorbing cylinders 2 each of which is filled in its interior area with an adsorbent 1 such as silica gel that selectively adsorbs ozone gas, a gas-introduction passage 4 connected in communication with the adsorbing cylinders 2 and an ozone raw-material gas source 3 such as an oxygen-gas storing vessel, a purified ozone-gas lead-through passage 5 led out of the adsorbing cylinders 2, and a through-gas gas-discharge passage 6 led out of the adsorbing cylinders 2. In the present embodiment, there are two adsorbing cylinders 2 arranged in parallel with each other. When one of the adsorbing cylinders 2 is during an adsorbing step, the other is during a desorption step.

A gas-introduction passage 4 is connected to each of the adsorbing cylinders 2 through a gas-introduction valve 7. An ozone generator 8, a mass flow controller 9 are arranged in the gas-introduction passage 4 in order from an upstream side thereof. Ozone-oxygen mixture gas generated by the ozone generator 8 is alternatively supplied to each of the adsorbing cylinders 2 in a constant flow amount by switching-over controlling the gas-introduction valve 7.

On the other hand, a purified ozone-gas lead-though passage 5 is connected to each of the adsorbing cylinders 2 through a gas lead-through valve 10. A diaphragm vacuum pump 11, a buffer tank 12, a mass flow controller 13 and a flow-passage opening and closing valve are disposed in the purified ozone-gas lead-though passage 5 in order from the side of the adsorbing cylinders. And the adsorbing cylinders 2 are alternatively communicated with the diaphragm vacuum pump 11 by switching-over controlling the gas lead-through valve 10.

Further, a gas-discharge passage 6 is connected to each of the adsorbing cylinders 2 through a gas-discharge valve 15. Arranged in the gas-discharge passage 6 is an ozone decomposer 16, an outlet of which is connected in communication with an upstream side of the ozone generator 8 in the gas-introduction passage 4. The gas-discharge valve 15 attached to each of the adsorbing cylinders 2 is opened and closed interlockingly with the opening and closing operation of the gas-introduction valve 7 attached to the same adsorbing cylinder 2, so that it is opened while supplying ozone-oxygen mixture gas into the adsorbing cylinders 2 so as to feed part of oxygen gas, which remains as it is not adsorbed to the adsorbent, and the ozone gas partly adsorbed and thus remaining, to the ozone decomposer 16.

In FIG. 1, numerals 17, 18, 19, 20 and 21 designate an ozone-concentration detector attached to an inlet portion of the ozone decomposer 16 in the gas-discharge route 6, another ozone-concentration detector attached to an outlet side of the mass flow controller 13 in the purified ozone-gas lead-through passage 5, a pressure gage indicating an inner pressure of each of the adsorbing cylinder 2 and the buffer tank 12, a by-pass passage for connecting a downstream side of the mass flow controller 9 arranged in the gas-introduction passage 4 in communication with an inlet portion of the ozone-concentration detector 17 in the gas-discharge passage 6, a flow-passage shut-off valve attached to the by-pass passage 20, respectively.

In the ozone condensing apparatus constructed as such, the ozone-oxygen mixture gas generated in the ozone generator 8 is supplied to one of the adsorbing cylinders 2 while the gas-introduction valve 7 and the gas-discharge valve 15 are opened with the gas lead-through valve 10 closed, and is made to pass through the adsorbing cylinder 2. At this time, the adsorbent 1 is maintained at a so-called normal temperature state (naturally left as it is) without being provided with any heating or cooling thermal energy from the exterior area. As for the ozone-oxygen mixture gas supplied to the adsorbing cylinders 2, its ozone component is adsorbed to the adsorbent 1, and part of the ozone gas adsorbed and thus remaining and oxygen gas as a carrier gas are fed from the gas-discharge passage 6 into the ozone decomposer 16.

When the ozone-oxygen mixture gas is flowed through an adsorbing cylinder 2 for a predetermined period of time and is adsorbed by the adsorbent 1 in a predetermined amount, the gas-introduction valve 7 in the adsorbing cylinder 2 through which the ozone-oxygen mixture gas is flowed until now is closed as well as the gas-discharge valve 15, with the gas lead-through valve 10 opened, the adsorbing cylinder 2 has its interior area communicated with a vacuum pump 11 so as to desorb the ozone component from the adsorbent 1 by vacuum-desorption and the thus desorbed purified ozone gas is fed to the buffer tank 12.

The purified ozone gas can be uniformized within the buffer tank 12 by temporarily storing it in the buffer tank 12 even if the ozone gas desorbed from the adsorbing cylinder 2 has its concentration varied, and the thus desorbed purified ozone gas can be supplied to an ozone-consumption equipment with its concentration retained within a predetermined range.

While this one of the adsorbing cylinders 2 is performing the desorption operation, the other adsorbing cylinder 2 effects an adsorbing operation. Thus the two adsorbing cylinders 2, 2 alternatively perform the adsorbing and desorbing operations so as to continuously take out the purified ozone gas. It is to be noted that the number of adsorbing cylinders 2 may be at least three. By controlling the switching-over timing of every valve in each of at least three adsorbing cylinders, the purified ozone gas can be continuously taken out.

Besides, as for the adsorbent in this case, although high-purity silica gel including a slight amount of metal component is preferable, it may be an ordinary adsorbent such as silica gel or zeolite.

Figure 3:
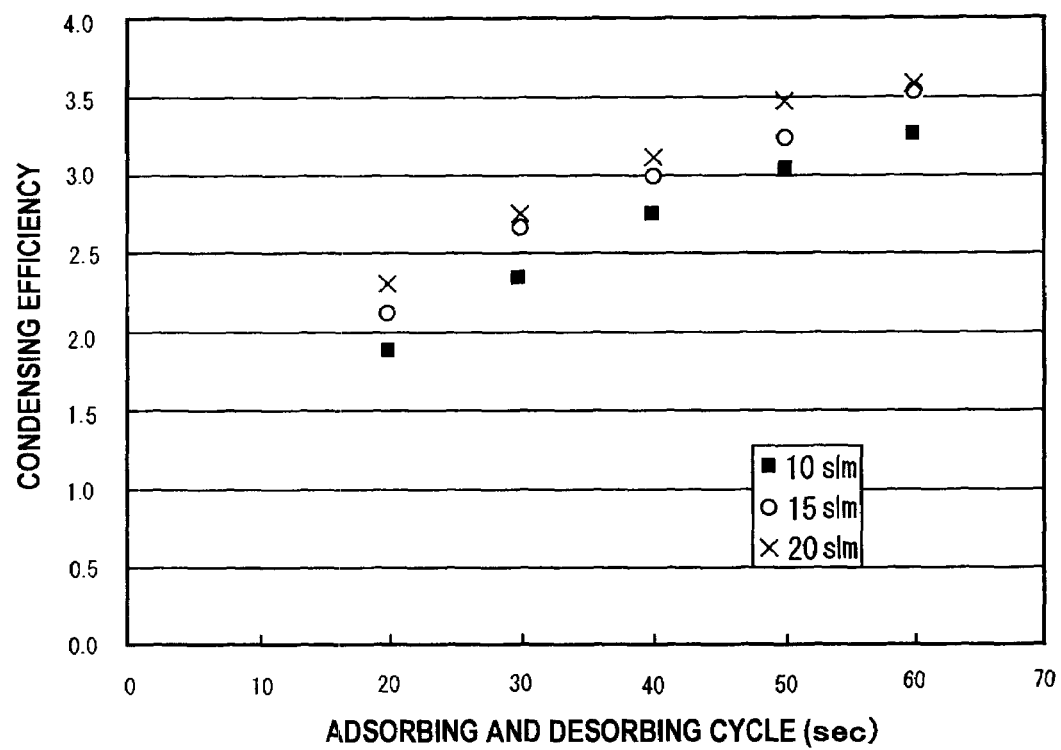
FIG. 3 is a schematic view showing a relationship between an adsorbing and desorbing cycle and a condensing rate.
Figure 4:
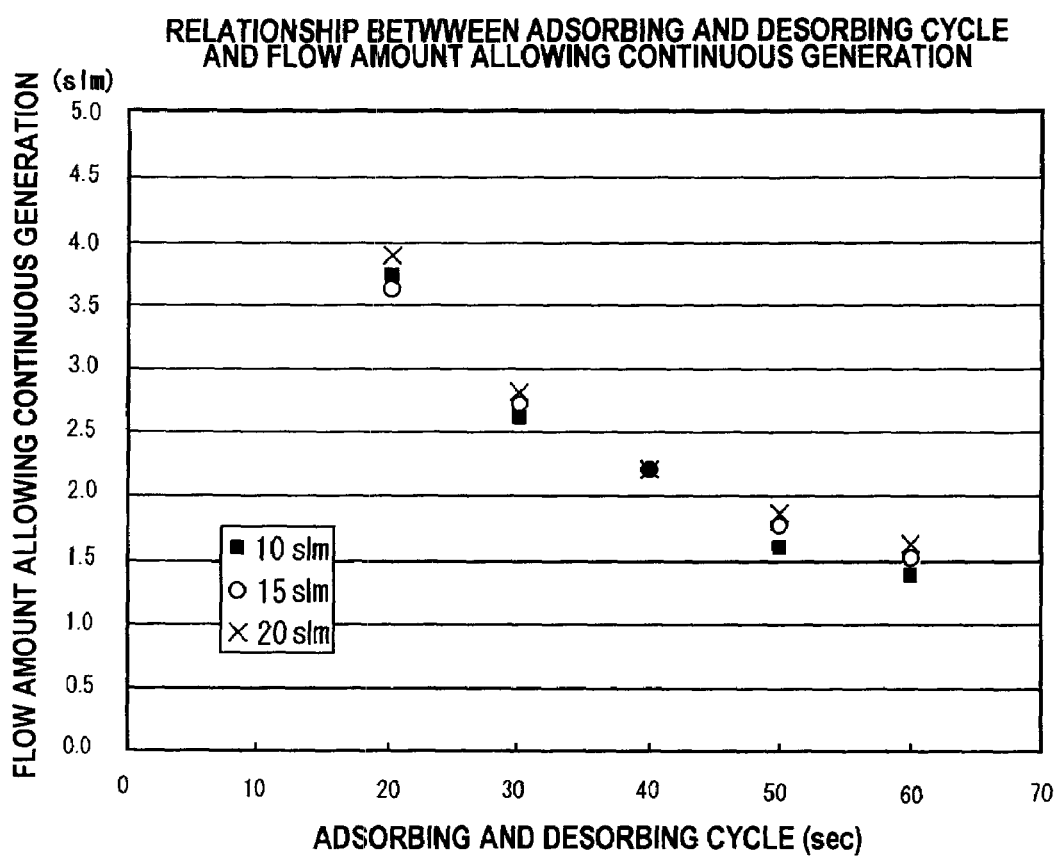
FIG. 4 is a schematic view showing a relationship between an adsorbing and desorbing cycle and a flow amount allowing continuous generation.

FIG. 2 is a Table showing a purified state of ozone in the case where the adsorbing flow amount is varied to 10 slm, 15 slm and 20 slm in order by fixing the concentration of the ozone gas, which is supplied to the adsorbing cylinder 2, to about 50 g/m3 (2.3 vol %) with the volume of 1 liter per cylinder and 730 g of filling amount of the adsorbent per cylinder. FIG. 3 shows a relationship between the condensing efficiency and the adsorbing and desorbing cycle, prepared based on the Table in FIG. 2. FIG. 4 shows a relationship between flow amount allowing continuous generation and the adsorbing and desorbing cycle, prepared based on the Table in FIG. 2.

It could be confirmed from FIGS. 2 and 3 or FIG. 4 that even if the adsorbing and desorbing cycle may be repeated without applying thermal energy to the adsorbent from the exterior area, the ozone gas fed to an adsorbing cylinder can be condensed about as much as three to four times.

The condensing efficiency becomes higher when the adsorbing and desorbing is repeated in a cycle of a certain period of time than when the adsorbing and desorbing is repeated in a cycle of a short period of time. Further, the shorter the cycle of switching over the adsorbing and the desorbing, the smaller the flow amount in which the ozone can be continuously supplied per cylinder.

In the above-mentioned embodiment, an explanation is given for the adsorbent 1 which retains the so-called normal-temperature state (naturally left as it is) without being provided with the heating or cooling thermal energy from the exterior area. However, part of the cooling chiller to be supplied for cooling the ozone generator 8 may be arranged so that it is fed to the adsorbing cylinder in order to remove the reaction heat of the ozone gas with the adsorbent.

INDUSTRIAL AVAILABILITY

The present invention is effective not only to the semiconductor production technique but also to the case where the ozone gas of middle concentration, which is about 30 to 40 vol %, is required in a large amount.

The invention claimed is:

1. A method of condensing ozone gas comprising the steps of:
    acting ozone-oxygen mixture gas on an adsorbing cylinder (2) which is filled in its interior area with an adsorbent (1), so as to selectively adsorb the ozone gas to the adsorbent (1); and
    desorbing the selectively adsorbed ozone gas to condense and purify the ozone gas,
characterized by
    acting the ozone-oxygen mixture gas to the adsorbent (1) in non-cooled state so as to selectively adsorb the ozone gas to the adsorbent (1);
    vacuuming the adsorbing cylinder (2) by a vacuum pump (11) on performing the ozone-gas desorption operation to desorb the ozone gas from the adsorbent (1); and
    feeding thus desorbed purified ozone gas from the adsorbing cylinder (2) to a buffer tank (12) arranged on a downstream side of the vacuum pump (11) so as to uniformize a concentration of the purified ozone gas.

2. The method of condensing ozone gas as set forth in claim 1, wherein the adsorbent (1) comprises silica gel of high purity.

3. An apparatus for condensing ozone gas comprising at least two adsorbing cylinders (2) arranged in parallel to each other, each of which is filled in its interior area with an adsorbent (1) that selectively adsorbs ozone gas in non-cooled state, a gas-introduction valve (7), a gas lead-through valve (10) and a gas-discharge valve (15) being attached, respectively to each of the adsorbing cylinders (2), a gas-introduction passage (4) with an ozone generator (8) attached thereto being connected to the gas-introduction valve (7), a purified ozone-gas lead-through passage (5) with a vacuum pump (11) and a buffer tank (12) attached thereto in order from the side of the adsorbing cylinder (2) being connected to the gas lead-through valve (10), a gas-discharge passage (6) with an ozone decomposer (16) attached thereto being connected to the gas-discharge valve (15), the gas-introduction valve (7) and the gas-discharge valve (15) attached to each of the adsorbing cylinders (2) being arranged to open and close synchronously, the gas-introduction valve (7) and the gas lead-through valve (10) attached to the same adsorbing cylinder (2) being controlled so as to open alternatively, and each of the valves (7, 10, 15) being switching-over controlled so as to alternatively repeat an adsorbing step of communicating each of the adsorbing cylinders (2) with the gas-introduction passage (4) and a desorption step of communicating each of the adsorbing cylinders (2) with the purified ozone-gas lead-through passage (5).

* * * * *